(12) United States Patent
Eversdijk et al.

(10) Patent No.: US 8,986,445 B2
(45) Date of Patent: Mar. 24, 2015

(54) CONTROLLED RELEASE OF ACTIVES FOR MATERIALS USED IN CONSTRUCTION

(75) Inventors: Jacobus Eversdijk, Den Bosch (NL);
Karin Tempelaars, Eindhoven (NL);
Rudolf Hartmut Fischer, Mierlo (DE)

(73) Assignee: Nederlandse Organisatie voor Toegepast-Natuurwetenschappelijk Onderzoek TNO (NL)

( * ) Notice: Subject to any disclaimer, the term of this patent is extended or adjusted under 35 U.S.C. 154(b) by 197 days.

(21) Appl. No.: 12/793,886

(22) Filed: Jun. 4, 2010

(65) Prior Publication Data

US 2010/0313786 A1   Dec. 16, 2010

Related U.S. Application Data

(63) Continuation of application No. PCT/NL2008/050780, filed on Dec. 8, 2008.

(30) Foreign Application Priority Data

Dec. 6, 2007   (EP) .................................... 07122503

(51) Int. Cl.
*C04B 28/02* (2006.01)
*C04B 14/20* (2006.01)
(Continued)

(52) U.S. Cl.
CPC .............. *C04B 14/208* (2013.01); *C01B 33/44* (2013.01); *C04B 26/02* (2013.01); *C04B 28/02* (2013.01); *C04B 28/14* (2013.01);
(Continued)

(58) Field of Classification Search
CPC ...... C01B 33/44; C01B 14/208; C01B 26/02; C01B 28/02; C01B 28/14; C01B 40/0039; C01B 24/16; C01B 24/04; C01B 24/003; C01B 2111/20; C01B 2103/69
USPC ......... 106/724, 694, 718, 725, 727, 773, 778, 106/803, DIG. 4
See application file for complete search history.

(56) References Cited

U.S. PATENT DOCUMENTS 3,888,684 A * 6/1975 Little ........................ 106/18.35
4,510,257 A * 4/1985 Lewis et al. .................... 502/63
(Continued)

FOREIGN PATENT DOCUMENTS

JP         6256563 A     9/1994
WO       94/05863 A3    3/1994
(Continued)

OTHER PUBLICATIONS

Narges Kalantari (Iranian Journal of Medical Sciences, vol. 10, No. 4, Winter 2008, p. 222-228, Received Nov. 3, 2007 and Accepted May 3, 2008).*
(Continued)

*Primary Examiner* — Paul Marcantoni
(74) *Attorney, Agent, or Firm* — Banner & Witcoff, Ltd.

(57) ABSTRACT

The invention is directed to a construction material and to the use of modified layered inorganic material.
The construction material of the invention comprises a layered inorganic material, which layered inorganic material comprises an ionic organic modifier compound and a biocide. The construction material of the invention has increased resistance against microbial fouling.

22 Claims, 9 Drawing Sheets

(51) Int. Cl.
*C01B 33/44* (2006.01)
*C04B 26/02* (2006.01)
*C04B 28/14* (2006.01)
*C04B 40/00* (2006.01)
*C04B 111/20* (2006.01)

(52) U.S. Cl.
CPC ........ C04B 40/0039 (2013.01); *C04B 2111/20* (2013.01); *Y10S 106/04* (2013.01)
USPC ........... 106/724; 106/694; 106/718; 106/725; 106/727; 106/773; 106/778; 106/803; 106/DIG. 4

(56) References Cited

U.S. PATENT DOCUMENTS

| | | | | |
|---|---|---|---|---|
| 4,637,992 A * | 1/1987 | Lewis et al. | | 502/84 |
| 4,849,006 A * | 7/1989 | Knudson, Jr. | | 71/64.11 |
| 5,057,153 A * | 10/1991 | Ruggiero | | 106/18.33 |
| 5,643,971 A * | 7/1997 | Roenigk | | 523/122 |
| 5,696,292 A * | 12/1997 | Cody et al. | | 564/296 |
| 5,730,996 A * | 3/1998 | Beall et al. | | 424/405 |
| 5,759,938 A * | 6/1998 | Cody et al. | | 502/62 |
| 5,830,528 A * | 11/1998 | Beall et al. | | 427/220 |
| 5,938,825 A * | 8/1999 | Gaglani et al. | | 106/18.32 |
| 5,952,095 A * | 9/1999 | Beall et al. | | 428/332 |
| 5,955,094 A * | 9/1999 | Beall et al. | | 424/405 |
| 6,083,559 A * | 7/2000 | Beall et al. | | 427/220 |
| 6,103,687 A * | 8/2000 | Cody et al. | | 510/504 |
| 6,126,734 A * | 10/2000 | Beall et al. | | 106/487 |
| 6,133,300 A * | 10/2000 | Smith et al. | | 514/373 |
| 6,165,485 A * | 12/2000 | Alther | | 424/421 |
| 6,197,805 B1 * | 3/2001 | Smith | | 514/388 |
| 6,207,290 B1 * | 3/2001 | Blum et al. | | 428/540 |
| 6,261,997 B1 * | 7/2001 | Rubin et al. | | 504/148 |
| 6,287,634 B1 * | 9/2001 | Beall et al. | | 427/220 |
| 6,461,423 B1 * | 10/2002 | Beall et al. | | 106/487 |
| 6,710,028 B2 * | 3/2004 | Lehmann | | 514/5.4 |
| 6,787,516 B2 * | 9/2004 | Moorfield et al. | | 510/507 |
| 6,897,191 B2 * | 5/2005 | Batdorf | | 510/382 |
| 7,105,476 B2 * | 9/2006 | Whilton | | 510/334 |
| 7,109,257 B2 * | 9/2006 | Lorah et al. | | 523/216 |
| 7,629,406 B2 * | 12/2009 | Qian et al. | | 524/445 |
| 7,642,308 B2 * | 1/2010 | Golba et al. | | 524/413 |
| 7,994,224 B2 * | 8/2011 | Wyers | | 514/628 |
| 2002/0055581 A1 * | 5/2002 | Lorah et al. | | 524/445 |
| 2002/0144630 A1 | 10/2002 | Ijdo et al. | | |
| 2002/0155970 A1 * | 10/2002 | Moorfield et al. | | 510/391 |
| 2003/0060555 A1 * | 3/2003 | Lorah et al. | | 524/445 |
| 2004/0185109 A1 * | 9/2004 | Cody et al. | | 424/489 |
| 2004/0213846 A1 | 10/2004 | Greenblatt et al. | | |
| 2005/0244439 A1 | 11/2005 | Bringley | | |
| 2007/0106007 A1 | 5/2007 | Abecassis | | |
| 2007/0227399 A1 * | 10/2007 | Abou-Nemeh | | 106/15.05 |
| 2008/0008678 A1 * | 1/2008 | Wyers | | 424/78.09 |
| 2008/0188587 A1 * | 8/2008 | Avakian | | 523/122 |
| 2009/0186227 A1 * | 7/2009 | Jarus et al. | | 428/412 |
| 2010/0144920 A1 * | 6/2010 | Page et al. | | 523/122 |
| 2010/0216908 A1 * | 8/2010 | Gao et al. | | 523/122 |
| 2010/0261820 A1 * | 10/2010 | Abecassis | | 524/127 |
| 2010/0331187 A1 * | 12/2010 | Williams et al. | | 504/291 |
| 2011/0275516 A1 * | 11/2011 | Wu et al. | | 504/105 |
| 2012/0190791 A1 * | 7/2012 | Chan et al. | | 524/707 |

FOREIGN PATENT DOCUMENTS

| | | |
|---|---|---|
| WO | 02/24759 A3 | 3/2002 |
| WO | 03/039251 A1 | 5/2003 |
| WO | 2007/114997 A3 | 10/2007 |

OTHER PUBLICATIONS

International Search Report relating to corresponding PCT/NL2008/050780.
English Abstract of JP 6256563.

* cited by examiner

US 8,986,445 B2

CONTROLLED RELEASE OF ACTIVES FOR MATERIALS USED IN CONSTRUCTION

RELATED APPLICATIONS

This application is a continuation of PCT application number PCT/NL2008/050780 designating the United States and filed Dec. 8, 2008; which claims the benefit of EP patent application number 07122503.1 and filed Dec. 6, 2007 both of which are hereby incorporated by reference in their entireties.

FIELD OF THE INVENTION

The invention is directed to a material for construction, to a method for controlling the release profile of a specific biocide in a material for construction, and to the use of an inorganic material.

BACKGROUND OF THE INVENTION

It is commonly known that micro-organisms can cause fouling and/or deterioration in construction, such as in buildings and in infrastructural constructions. An example of microbial fouling is fouling due to algae. Such fouling mostly leads to an undesirable staining of the construction. Another frequently observed form of fouling is fouling due to fungi. Especially in moist or damp environments, for example in a bathroom or shower, this often leads to undesirable staining. The removal of microbial fouling is often not easy and frequently requires chemicals that are environmentally harmful. Moreover, once the microbial fouling has been chemically removed, the fouling may return in time.

Making construction material resistant to microbial fouling, such as algae fouling and fungi fouling, is difficult because the construction materials, such as cement and plaster, typically have high pH values (often pH 10 or more). Inclusion of a biocide, such as a fungicide, into the construction materials in order to render them more resistant to microbial fouling normally leads to inactivation or even to degradation of the biocide due to the high pH levels. Due to the short leaching time of the biocides in the construction material the biocide has a reduced life span. As a consequence, in order to retain the resistance to microbial fouling over an extended period of time a high concentration of biocides in the construction materials is required. Such high concentrations of biocide have the disadvantage of inducing health problems and are therefore undesirable.

DETAILED DESCRIPTION

Figure 1:
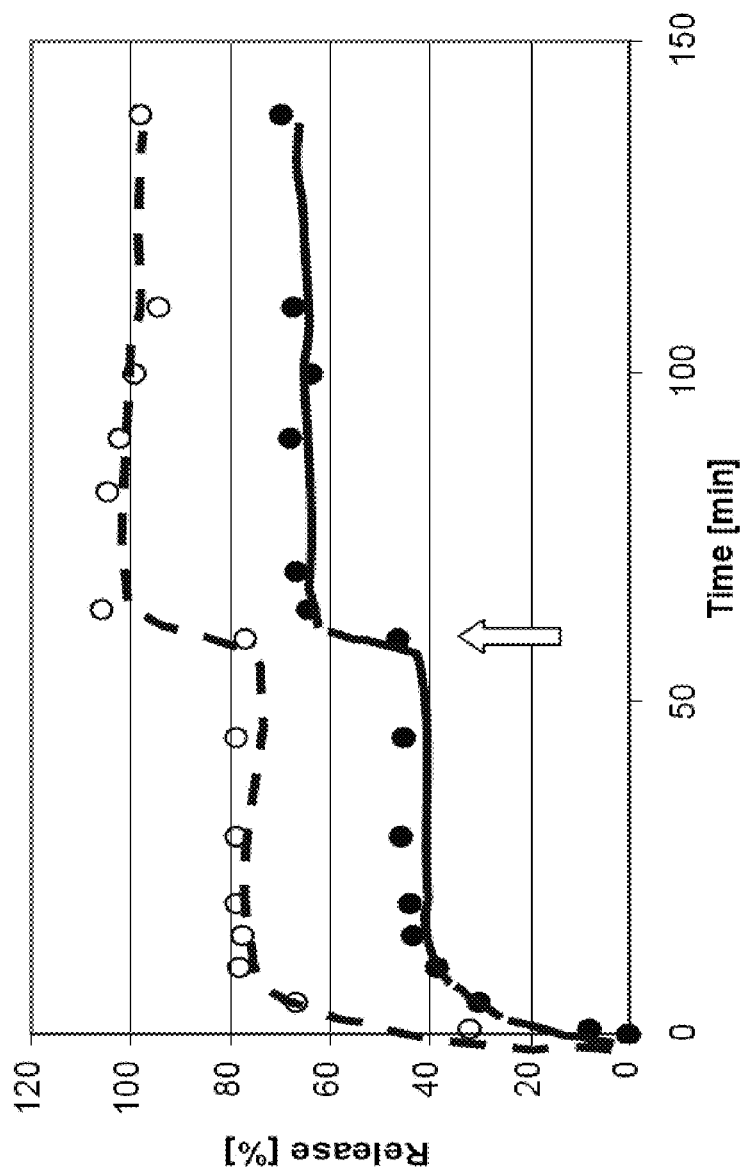
FIG. 1 graphically depicts the release of biocide (Wocosen) from both the 100% hydrophobic modified clay (solid line) and the 50/50% hydrophilic/hydrophobic modified clay (dashed line). The arrow represents extra water added.

Object of the invention is to provide a material for construction that is at least partly resistant to microbial fouling.

A further object of the invention is to increase the life span of a biocide in a material for construction.

Yet another object of the invention is to provide a material for construction that has antimicrobial effectiveness even when the antimicrobial compound is present in low concentrations.

Another object of the invention is to provide a material for construction that can controllably release a biocide.

A further object of the invention is to provide a method for tuning the release profile of a biocide from a material for construction.

It was found that these objects can at least partially be met by providing a material for construction with a slow release system containing a modified inorganic material.

Accordingly, in a first aspect the present invention is directed to a material for construction comprising an inorganic material with plate-like structure, wherein the inorganic material is modified with one or more ionic organic modifier compounds and wherein said inorganic material is intercalated with a biocide.

It was found that the inorganic material with the plate-like structure acts as a stabilising agent for the biocide, which can consequently survive the high pH values of the construction material. The lifespan of the biocide is thereby greatly increased, also because, whilst intercalated in the inorganic material, the biocide is protected from other chemical attacks that can decrease its antimicrobial activity.

The material for construction can be any kind of material suitable for construction purposes, both organic and inorganic materials. Some examples include cement, plaster, jointing compound, plasterboard, paint, glue, plastics, wallpaper, wood, textiles, straw, thatch, triplex, Oriented Strand Board (OSB), particle board, and Medium-Density Fibreboard (MDF). In an embodiment the material for construction is a construction material.

The inorganic material with the plate-like structure to be used in the invention can suitably be a layered inorganic material. The inorganic material can be a negatively charged material, or a positively charged material. Examples of suitable negatively charged layered inorganic materials are clays, such as smectite, montmorillonite, kaolinite, vermiculite, bentonite, saponite and hectorite. Examples of suitable positively charged layered inorganic materials are layered double hydroxides, such as hydrotalcites. Preferably, the inorganic material to be used in the invention comprises a clay and/or a layered double hydroxide.

The solvated counter ions of the initial inorganic material are not of great importance and can for instance be $Na^+$, $Mg^{2+}$, and/or $Ca^{2+}$ in the case of a negatively charged inorganic material, or $CO_3^{2-}$, $Cl^-$, $NO_3^-$, and/or $SO_4^{2-}$ in the case of a positively charged inorganic material.

Many commercially available biocides are not suitable for direct ion exchange reactions with the inorganic materials. These biocides normally do not have special affinity for non-modified layered inorganic materials. In order to intercalate such biocides in layered inorganic materials, the layered inorganic materials need to be modified. It is possible to substitute the counter ions that are present between the layers for functional organic molecules and thereby change the hydrophobicity of the layered material and improve the affinity of the neutral biocide molecules for the layered inorganic material. This principle is for instance well-known for modifying clay. Clay that is modified with such functional organic molecules is commonly referred to as organoclay.

By carefully selecting the type and amount of the ionic organic modifier used and matching this to the specific biocide that is used, it is possible to delicately control the affinity of the biocide for the modified layered inorganic material and over the release rate of the biocide from the inorganic material. Therefore, in a preferred embodiment the one more ionic organic modifier compounds have a chemical or physical interaction with the biocide, preferably an ionic interaction and/or a hydrogen bond interaction.

Typically, the modification of the inorganic material involves swelling of the inorganic material in a solvent, typically water, thereby increasing the interlayer distance, which is the shortest distance between individual plates. Next, the ionic organic modifier compound is intercalated between the layers by means of ion exchange against the available solvated counter ions present in the inorganic material. The ionic organic modifier compound can be already contained in the solvent used for increasing the interlayer distance of the inorganic material. Finally, the interlayer thickness is again reduced by removal of solvent.

In a special embodiment of the invention, the inorganic material is intercalated and thereby modified with a mixture of at least two different ionic organic modifier compounds. This allows an even better control over the affinity of the biocide for the modified inorganic material and over the release rate of the biocide from the inorganic material, since the hydrophilicity of the layers can be adjusted in a very delicate way by choice of type and ratio of the two different organic modifier compounds.

The efficacy of modification can be tested by thermo gravimetric analysis. In a preferred embodiment, at least 25%, preferably at least 50%, more preferably at least 100% of the exchange capacity of the inorganic material is occupied by the one or more ionic organic modifier compounds.

The interlayer thickness of the modified inorganic material depends on the size of the one or more ionic organic modifier compounds. The interlayer thickness can typically be increased with respect to the initial, non-modified inorganic material with 20%, preferably with 50%. Increasing the interlayer thickness of the initial, non-modified inorganic material with more than 500% can destabilise the inorganic material. Accordingly, the interlayer thickness of the inorganic material with respect to the initial, non-modified, inorganic material is preferably 20-500%, more preferably 20-300%. The interlayer thickness of the inorganic material can be determined by X-ray diffraction measurements on the dry inorganic material.

Any charged organic compound can suitably be used as ionic organic modifier compounds. In particular, this encompasses positively charged compounds such as ammonium, phosphonium compounds, sulphonium compounds, and mixtures thereof, and negatively charged compounds such as the conjugate bases of carboxylic acids, phosphonic acids and sulphonic acids, and mixtures thereof. Some hydrophobic ionic organic modifier compounds that can suitably be used in accordance with the invention include dihydrogenated tallow dimethyl ammonium chloride, ditallow dimethyl ammonium chloride, hydrogenated tallow trimethyl ammonium chloride, tallow trimethyl ammonium chloride, hexadecyl trimethyl ammonium chloride, coco trimethyl ammonium chloride, oleyl trimethyl ammonium chloride, tallow trimethyl ammonium chloride, tetradecyl trimethyl ammonium bromide, didecyl dimethyl ammonium chloride, dioctyl dimethyl ammonium chloride. Also ammonium compounds derived from the amines can be used, such as dodecyl amine, octadecyl amine, coca amine, oleyl amine, hydrogenated tallow amine, tallow amine, dihydrogenated tallow amine, hexadecyl dimethyl amine, coco dimethyl amine, oleyl dimethyl amine, didecyl methyl amine, dicoco methyl amine, and dihydrogenated tallow methyl amine. Some hydrophilic ionic organic modifier compounds that can suitably be used in accordance with the invention include dipolyoxyethylene tallow methyl ammonium chloride, and ammonium compounds derived from the polyoxyalkyleneamines, such as polyoxyalkylenemonoamines, polyoxyalkylenediamines, and polyalkylenetriamines. Suitable examples include the following polyoxyalkyleneamines under the trade name Jeffamine® (available from Huntsman Corporation, USA) M1000, M2005, M2070, D230, D400, D2000, D4000, ED600, ED900, ED2003, EDR148, EDR176, T403, T3000 and T5000.

Positively charged organic compounds can be used in combination with negatively charged inorganic materials, while negatively charged organic compounds can be used in combination with positively charged inorganic materials.

The one or more ionic organic modifier compounds which are introduced in the inorganic material increase the affinity of the biocide molecules for the inorganic material. These biocide molecules can be adhered in a subsequent step by swelling the modified material in a solvent, thereby increasing the interlayer distance. Next, the biocide diffuses between the plates of the modified inorganic material. The biocide can be already contained in the solvent used for increasing the interlayer distance of the inorganic material. Finally, the interlayer thickness is again reduced by removal of solvent.

In another embodiment, it is also possible to introduce the biocide molecules into the modified inorganic material from the gas phase or vapour phase.

In a special embodiment the solvent used for increasing the interlayer distance of the inorganic material comprises both the ionic organic modifier compound and the biocide. Both molecules can then be intercalated in the inorganic material in one process step, thereby reducing process costs.

Some preferred commercial examples of biocides are Wocosen, Troysan polyphase P100, imazalil, and bethoguard. Wocosen is a fungicide which has as an active agent propiconazole (1-[[2-(2,4-dichlorophenyl)-4-propyl-1,3-dioxolan-2-yl]methyl]-1,2,4-triazole). Troysan polyphase P100® is a fungicide which has as an active agent carbonic acid, butyl-3-iodo-2-propynylester. Imazalil is a fungicide and pesticide of chemical formula 1-[2-(2,4-dichlorophenyl)-

2-(2-propenyloxy)ethyl] 1H imidazole. Bethoguard is a fungicide and algaecide which has as an active agent bethoxazin (3-benzo[b]thien-2-yl-5,6-dihydro-1,4,2-oxathiazine 4-oxide).

Other biocides (including fungicides, algicides and/or bactericides) that can be used in the present invention include pyrithiones, such as zinc pyrithione, sodium pyrithione, and bispyrithione; hydroxypyridone, substituted benzenes, such as 1,4-dichloro-2,5-dimethoxybenzene (chloroneb), tetrachloroisophthalonitrile (chlorothalinil), hexachlorobenzene, and pentachloronitrobenzene; thiocarbamates, such as iron (III) dimethylaminomethanedithioate (ferbam), sodium methylaminomethanedithioate (metam sodium), 1-(dimethylthiocarbamoyldisulphanyl)-N,N-dimethyl-methanethioamide (thiram), and zinc(II) dimethylaminomethanedithioate (ziram); ethylene bis dithiocarbamates (EBDC's), such as mancozeb, manganese(II) [2-(sulphidocarbothioylamino)ethylamino]methanedithioate (maneb), [2-(sulphanylcarbothioylamino)ethylamino]methanedithioic acid (nabam), and zinc(II) 2-(sulphidocarbothioylamino)ethylamino]methanedithioate (zineb); thiophthalimides, such as 2-(trichloromethylsulphanyl)-3a,4,7,7a-tetrahydroisoindole-1,3-dione (captan), 2-(1,1,2,2-tetrachloroethylsulphanyl)-3a,4,7,7a-tetrahydroisoindole-1,3-dione (captafol), and 2-(trichloromethylsulfanyl)isoindole-1,3-dione (folpet); organomercury compounds, such as ethyl mercury, methyl mercury, and phenyl mercuric acetate; organotin compounds, such as triphenyltin (fentin); and miscellaneous organic fungicides, such as methyl N-[1-(butylcarbamoyl)benzoimidazol-2-yl]carbamate (benomyl), 4-[2-[(1S,3S,5S)-3,5-dimethyl-2-oxo-cyclohexyl]-2-hydroxy-ethyl]piperidine-2,6-dione (cyclohexamide), 3-(3,5-dichlorophenyl)-2,4-dioxo-N-propan-2-yl-imidazolidine-1-carboxamide (iprodione), methyl 2-[(2,6-dimethylphenyl)-(2-methoxyacetyl)amino]propanoate (metalaxyl), 2-(1,3-thiazol-4-yl)-1H-benzoimidazole (thiabendazole), and 1-(4-chlorophenoxy)-3,3-dimethyl-1-(1,2,4-triazol-1-yl)butan-2-one (triadimefon).

The amount of biocide that is introduced into the modified inorganic material depends on the available adsorption sites. In practice, it is very hard to produce an inorganic material which comprises more than 50 wt. % of biocide. Preferably, there is a minimum amount of biocide in the inorganic material in order to have a long lasting biocidal effect. This minimum amount is for instance 1 wt. %, preferably 5 wt. %, more preferably 10 wt. % based on the total weight of the modified and loaded inorganic material. Accordingly, the amount of biocide in the inorganic material is preferably 1-30 wt. %, preferably 5-30 wt. %, more preferably 10-30 wt. %, based on the total weight of the modified and loaded inorganic material.

The amount of biocide comprised in the material for construction according to the invention can be low in comparison to the amount of biocides conventionally used in construction materials. Typically, the amount of biocide loaded inorganic material used in the material of the invention is in the range of 0.01-20 wt. %, based on the total weight of the material for construction. This corresponds to an amount of 1-60 000 ppm. For instance, the amount of biocide loaded inorganic material in the material for construction can be 0.02-20 wt. %, such as 0.1-20 wt. % or 50-60 000 ppm. Preferably, the amount of loaded inorganic material used in the material for construction is in the range of 0.01-10 wt. %, based on the total weight of the material for construction. This corresponds to an amount of 1-30 000 ppm of biocide in the material for construction, based on the total weight of the material for construction. For instance, the preferred amount of biocide loaded inorganic material in the material for construction is 0.1-10 wt. %, such as 1-10 wt. % or 50-30 000 ppm.

An advantage of the present invention is that biocide release is increased in moist environments. Such moist or damp environments often are the cause of the microbial fouling and therefore an increase in the amount of released biocide is effective in reducing or preventing the microbial fouling.

The biocide that is not yet released is stabilised by the protective environment of the plate-like inorganic material against premature degradation due to potentially harmful influences such as high alkalinity, chemical attacks or UV irradiation.

A further advantage is that the diffusion of the biocide out of the inorganic material is reversible. Once the environment has turned dry, the biocide that has been released from the inorganic material can diffuse back into the inorganic material where it is once more stabilised against high pH and chemical attacks. This significantly increases the life span of the biocide, but also the life span of the effectiveness of the construction material against microbial fouling.

In a further aspect the invention is directed to a method for controlling the release profile of a specific biocide in a material for construction, comprising
  providing an inorganic material with plate-like structure;
  adjusting the affinity of the inorganic material to the specific biocide by modifying the inorganic material with one or more ionic organic modifier compounds specifically selected for their interaction with the biocide;
  intercalating the modified inorganic material with the biocide; and
  including the modified and intercalated inorganic material in a material for construction.

Preferably, the one more ionic organic modifier compounds have a chemical or physical interaction with the biocide, such as an ionic interaction and/or a hydrogen bond interaction, which allows a specifically good control over the release rate of the biocide.

In yet a further aspect the invention is directed to the use of a slow biocide release system based on an inorganic material as defined herein as an agent for reducing or preventing undesirable microbial fouling. In particular, this encompasses the application for reducing or preventing fungal fouling. It is preferred that the slow biocide release system based on an inorganic material as defined herein is used as an agent for reducing or preventing undesirable microbial fouling in a material for construction. Hence, in particular, the material for construction of the invention can be used for reducing or preventing microbial fouling, fungal fouling and/or algae fouling.

EXAMPLES

Modification of Clay with Organic Modifier

Nanofill 116 clay (200 g) was dispersed in 5 l demineralised water (demi-water) and stirred for 18 h in order for exfoliation to occur. The modifiers (in 10% excess with respect to the molar equivalent of the cation exchange capacity (CEC) of dry Nanofill 116) are dissolved in 3 l of demi-water. Three different modifications are performed with:
  100 wt. % of Arquad HC (di(hydrogenated tallow)dimethylammonium chloride.
  100 wt. % of Ethoquad HT/25 (PEO(15)hydrogenated tallow methylammonium chloride.
  50 wt. % of Arquad HC, 50 wt. % Ethoquad Before the modifiers were added to the exfoliated clay platelets, the temperature of both the dispersion and the solution was raised to 45° C. The modifier solution was added to the clay dispersion under stirring with a mechanical stirrer. After addition the mixture was left to cool to 20° C. under stirring.

To eliminate the excess of modifier and the exchanged sodium salts from the product, the mixture was filtered over a Büchner funnel and washed 5 times with 5 to 8 l of demi-water. The resulting material is freeze dried to remove the water from the modified clay, resulting in a fluffy powder.

Introduction of Biocide (Intercalation)

For the introduction of the biocide in between the modified clay platelets (intercalation) an amount of biocide was dissolved in tetrahydrofuran (THF) corresponding to 10 wt. % in relation to the amount of modified clay. To this solution, the dried modified clay material was added under stirring with a magnetic stirrer. After addition of the clay, additional THF was added in order to obtain a homogeneous mixture. This mixture was stirred overnight at 20° C.

Subsequently, the THF was removed with the use of a rotation evaporator. This resulted in a dense and coarse material. To obtain a more defined powder, the crude material was milled and sifted with a 90 μm sieve. This powder fraction, smaller than 90 μm, was used in further release and formulation experiments.

Release of Biocide from Organoclay in Powder Form

To establish the release of biocide from the different organoclays, the following procedure was followed.

To an amount of 300 g of water an amount of 0.2 grams of intercalated organoclay (10 wt. % of biocide loading) was added under continuous stirring with a magnetic stirring rod. By sampling the water phase (using a 0.45 μm syringe filter to prevent colloidal particles in the measuring cuvette) at different intervals and photometric analysis (with the use of a Hitachi U-2001 spectrophotometer) of this sample, the amount of released biocide was determined at 20° C. The amount of water that is added (300 g) was an excess with respect to the total amount of water that was needed for complete dissolution of the used biocides.

When equilibrium was reached (no more significant release was visible), an extra amount of 300 g of water was added.

Release of Wocosen

FIG. 1 shows that the release of biocide (Wocosen) from both the hydrophobic modified and the 50/50 hydrophilic/hydrophobic modified clay reaches equilibrium. In case of the hydrophilic/hydrophobic modified clay this was reached at 80% release whilst for the hydrophobic clay this was already established at 40% release of Wocosen.

The initial release rate (indicated by the slope of the graph) is also dependent on the type of modification; the hydrophobic modified clay shows a lower release rate in comparison to the hydrophilic/hydrophobic modified clay material.

When an equilibrium was reached, in both cases, an extra amount of water was added (which doubled the amount of water). The hydrophilic/hydrophobic modified clay showed a complete release of all the biocide present whilst in the case of the hydrophobic modified clay a new equilibrium was reached at 65%.

Release of Imazalil

Figure 2:
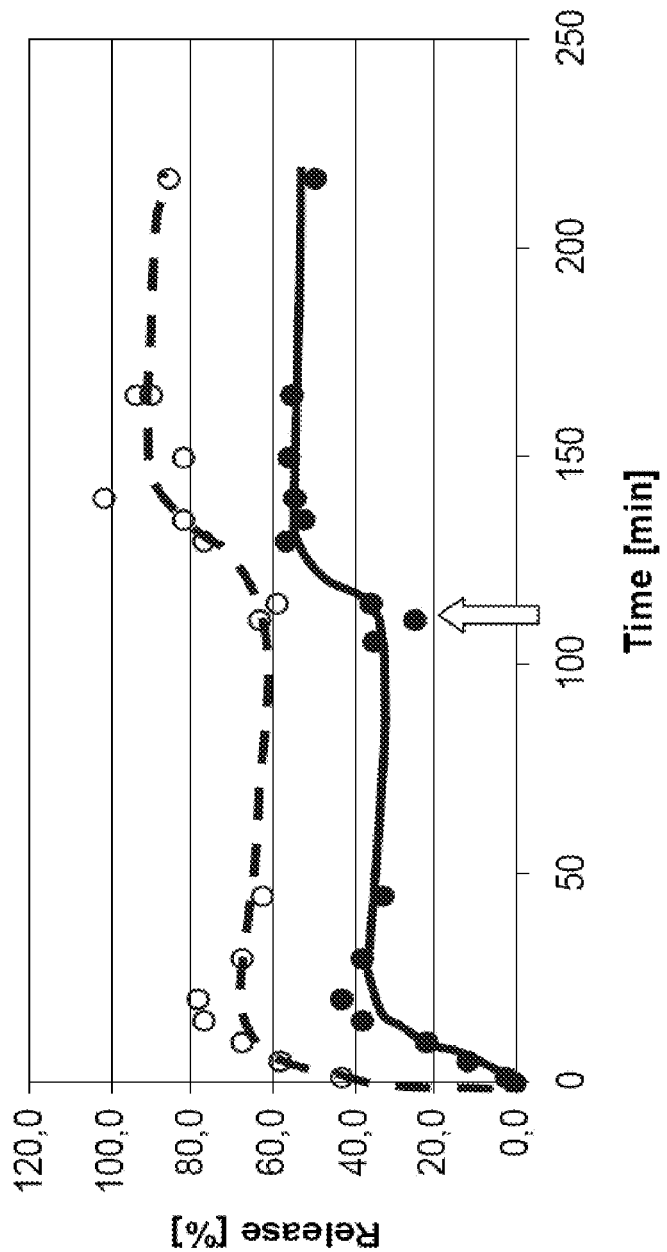
FIG. 2 graphically depicts the release of biocide (Imazalil) from both the 100% hydrophobic modified clay (solid line) and the 50/50% hydrophilic/hydrophobic modified clay (dashed line). The arrow represents extra water added.

FIG. 2 shows that the release of biocide (Imazalil) from both the hydrophobic modified and the 50/50 hydrophilic/hydrophobic modified clay reaches equilibrium. For the hydrophilic/hydrophobic modified clay this was reached at 70% release whilst for the hydrophobic clay this equilibrium was already established at 35% release of Imazalil As was the case for the release of Wocosen, the initial release rate of Imazalil was also strongly dependent on the type of modification; the hydrophobic modified clay showed a much lower release rate in comparison to the hydrophilic/hydrophobic modified clay material.

When an equilibrium was reached, in both cases, an extra amount of water was added (which again doubled the amount of water). The hydrophilic/hydrophobic modified clay showed a near complete release of all the biocide present whilst in the case of the hydrophobic modified clay a new equilibrium was reached at 55%.

Release of Bethoguard

Figure 3:
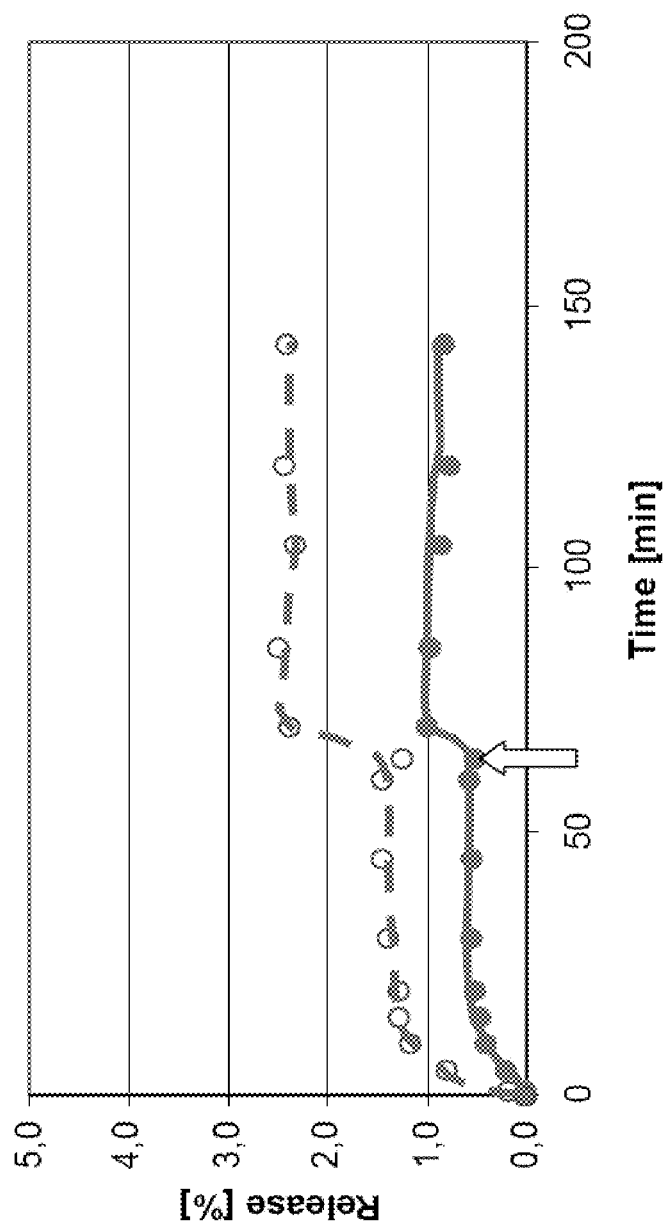
FIG. 3 graphically depicts the release of Bethoguard from both the 100% hydrophobic modified clay (solid line) and the 50/50% hydrophilic/hydrophobic modified clay (dashed line). The arrow represents extra water added.

The release of Bethoguard from the 100% hydrophobic and the 50/50 hydrophilic/hydrophobic modified clays was much slower than in the case of Wocosen and Imazalil, as can be seen in FIG. 3. In case of the hydrophilic/hydrophobic modified clay the first equilibrium was reached at 1.5% release whilst for the hydrophobic clay this was established at a mere 0.5% release of Wocosen. Addition of extra water, thus doubling the initial amount, leads to an increase in release to 2.5% of Bethoguard in case of the hydrophilic/hydrophobic modification. For the hydrophobic modified clay the new equilibrium levels off at around 1%.

Figure 4:
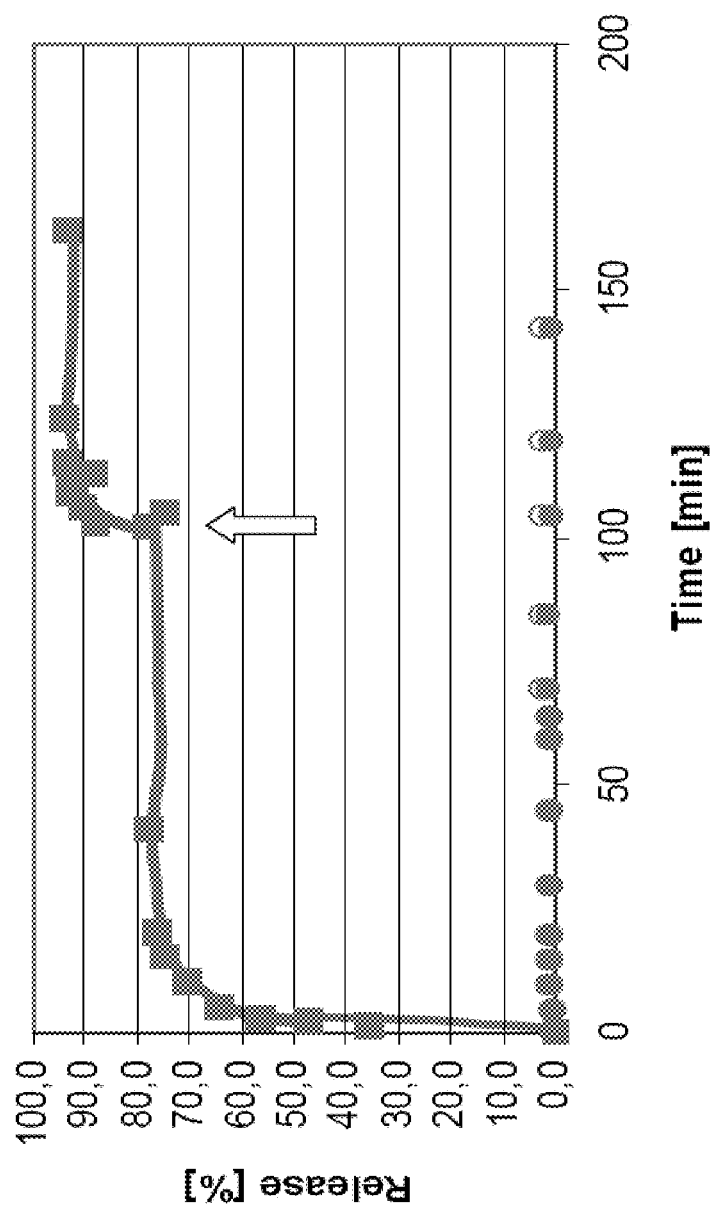
FIG. 4 graphically depicts the release of Bethoguard from 100% hydrophilic modified clay. The arrow represents extra water added.

Since the release of Bethoguard from the hydrophilic/hydrophobic modified clay material forms equilibrium at a very low value in relation to the total available amount of biocide in the system, release studies were also performed on the 100% hydrophilic modified clay. FIG. 4 shows the release of Bethoguard from this material. It is clear that the hydrophilic modified clay has much less ability to retain the Bethoguard under these conditions. However, equilibrium at 80% release was still established in the release experiment. After addition of an extra amount of water the release of Bethoguard reached 95% of the theoretical amount of Bethoguard present in the system.

Formulation of Organoclay with Biocide in Gypsum

Formulations of the different biocidal compounds in gypsum were prepared according to the weights in Table 1. The biocidal materials were dissolved or dispersed in water. When dissolution in water as such was not possible because of the poor water-solubility of the compound, ethanol was added until a clear solution was obtained. In case wetting of the hydrophobic clay-biocide powder was problematic, again an amount of ethanol was added to the water phase in order to obtain a homogeneous dispersion.

Subsequently, $CaSO_4 \cdot \frac{1}{2}H_2O$ was added as a dry powder under stirring with a dissolver (Dispermat). After a quick homogenisation, the gypsum slurry was poured in plastic cups (h=5 mm d=35 mm) and the top was levelled off with a knife in order to obtain a smooth surface. All these steps have to be done rather fast to prevent premature solidification of the gypsum during the handling of the slurry. The samples were dried at 20° C. on air for a minimum of 10 days.

To establish the release of biocide from the different gypsum plaster samples, the following procedure was followed.

TABLE 1

|  | Mass [g] | $CaSO_4 \cdot \frac{1}{2}H_2O$ [g] | Demi-water [g] | Ethanol [g] |
|---|---|---|---|---|
| Hydrophilic/hydrophobic modified clay with Wocosen | 2.5 | 60 | 40 | 5 |
| Hydrophobic modified clay with Wocosen | 2.5 | 60 | 40 | 5 |
| Hydrophilic/hydrophobic modified clay with Imazalil | 2.5 | 60 | 40 | 5 |

TABLE 1-continued

|  | Mass [g] | CaSO$_4$·½H$_2$O [g] | Demi-water [g] | Ethanol [g] |
|---|---|---|---|---|
| Hydrophobic modified clay with Imazalil | 2.5 | 60 | 40 | 5 |
| Hydrophilic/hydrophobic modified clay with Bethoguard | 2.5 | 60 | 40 | 5 |
| Hydrophobic modified clay with Bethoguard | 2.5 | 60 | 40 | 5 |

Release of Biocide from Gypsum

In a 3 l glass beaker with an amount of 300 g of demi-water, a plastic cup with gypsum plaster as described above was placed on the bottom of the beaker. Release of the biocide was monitored under continuous stirring with a magnetic stirring rod at 20° C. By sampling the water phase at different intervals and photometric analysis of this sample, the amount of released biocide was determined. The amount of water present (300 g) was an excess with respect to the total amount of water that was needed for complete dissolution of the used biocides in the gypsum plaster samples.

When equilibrium was reached (no more significant release is visible), an extra amount of 300 g of water was added.

Release of Wocosen from Gypsum Plaster

Figure 5:
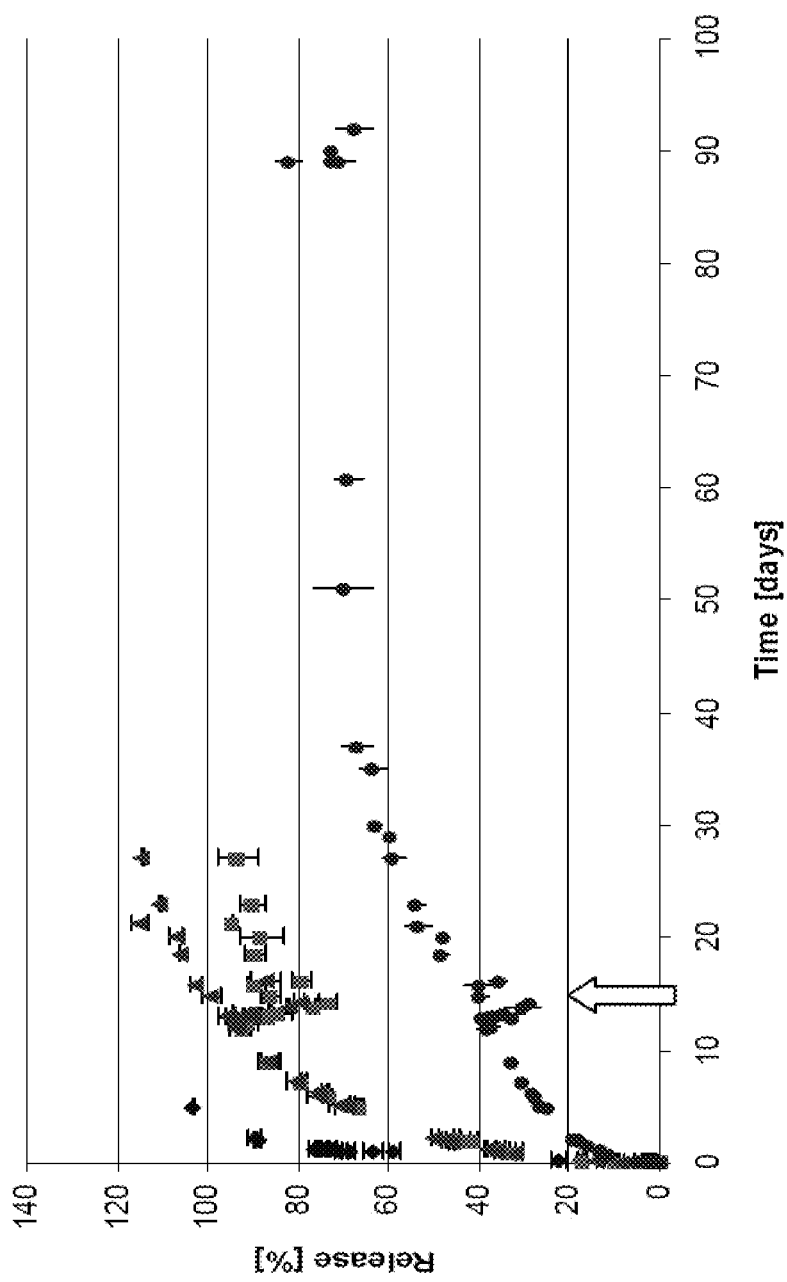
FIG. 5 graphically depicts the release of Wocosen from plaster. Diamonds, pure Wocosen; squares, pre-formulated Wocosen; triangles, hydrophilic/hydrophobic clay; circles, hydrophobic clay; arrow, extra water added.

The release of Wocosen from the gypsum plaster samples under stirring in an excess amount of water is shown in FIG. 5. The data points in FIG. 5 are the calculated means of duplicate measurements on two gypsum samples.

The non-formulated (pure) Wocosen leached out of the gypsum sample quite rapidly under these test conditions. Total depletion of the sample takes place within 1 week. The pre-formulated Wocosen and the Wocosen intercalated in the hydrophilic/hydrophobic modified clay showed more or less the same reduction in release rate. The release rate of the Wocosen intercalated in the hydrophobic clay was reduced significantly. Furthermore, equilibrium was formed at 40% release.

Release of Imazalil from Gypsum Plaster

Figure 6:
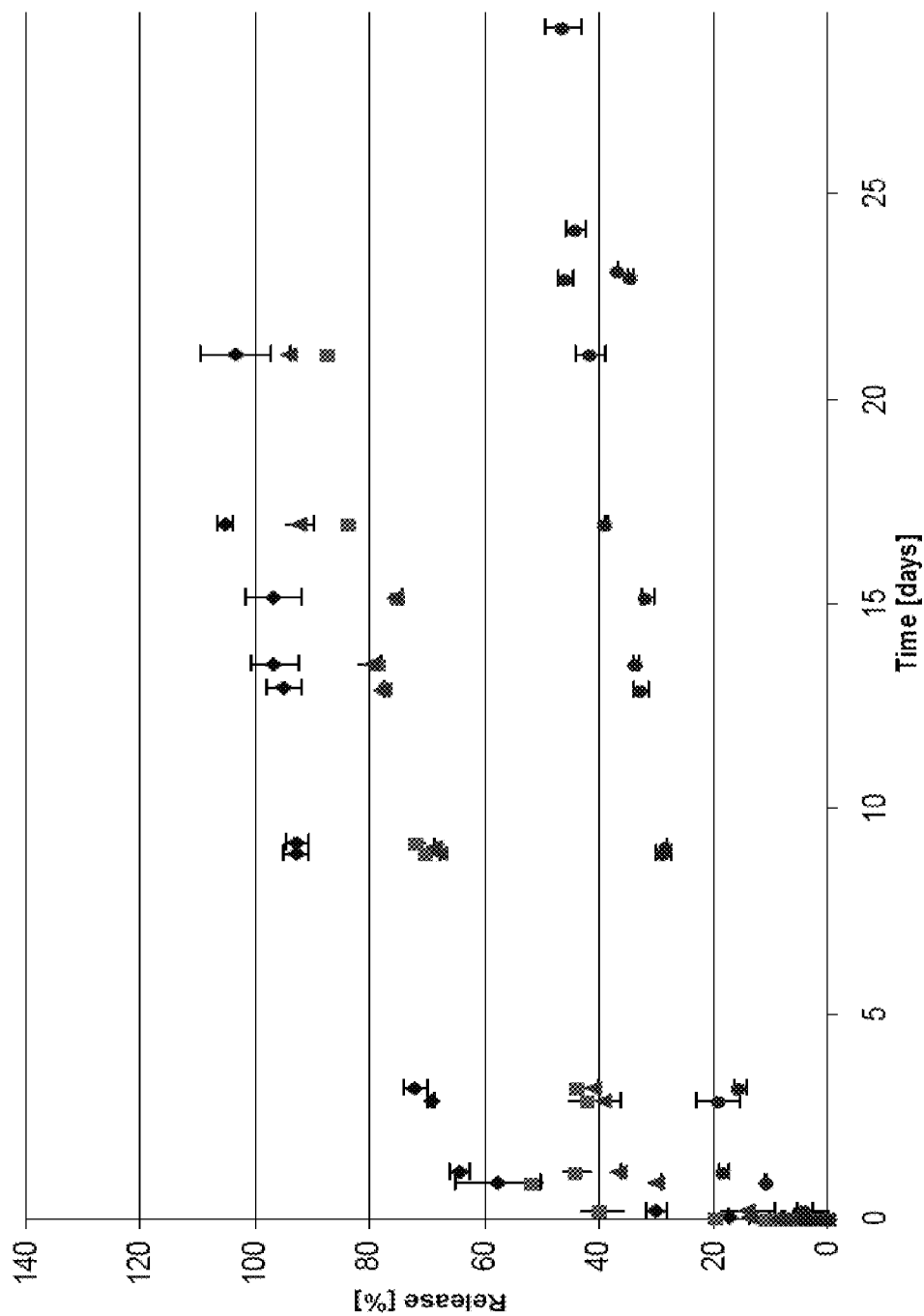
FIG. 6 graphically depicts the release of Imazalil. Diamonds, pure Imazalil; squares, pre-formulated Imazalil; triangles, hydrophilic/hydrophobic clay; circles, hydrophobic clay.

The release rates of pure Imazalil, pre-formulated Imazalil and the Imazalil intercalated in the 50/50 hydrophilic/hydrophobic modified clay were quite fast, see FIG. 6.

As in the case of Wocosen the release of Imazalil from the hydrophobic modified clay, imbedded in the gypsum plaster matrix, was significantly slowed down. Equilibrium was formed at around 50% of the theoretical release. Upon addition of a double amount of water, a drop in Imazalil in the water phase was detected; as in the case of Wocosen.

Artificial Rain Test

Formulations of Wocosen, intercalated into hydrophobic modified clay, in gypsum are prepared according to the weights in Table 2. The Wocosen is dissolved in ethanol and added subsequently to the amount of water. The Wocosen, intercalated into hydrophobic modified clay, is dispersed into a mixture of the ethanol and water. Subsequently, CaSO$_4$·½H$_2$O is added as a dry powder under stirring with a dissolver (Dispermat). After a quick homogenisation, the gypsum slurry is poured in plastic cups (h=5 mm; d=35 mm) and the top is levelled off with a knife in order to obtain a smooth surface. All these steps have to be done rather fast to prevent premature solidification of the gypsum during the handling of the slurry. The samples are dried at 20° C. on air for a minimum of 10 days.

TABLE 2

|  | Biocidal additive [g] | CaSO$_4$·½H$_2$O [g] | Demi-water [g] | Ethanol [g] |
|---|---|---|---|---|
| Pure Wocosen | 2.2 | 2163 | 993 | 449 |
| Hydrophobic modified clay with Wocosen | 17.3 | 1297 | 594 | 269 |
| Reference | — | 434 | 199 | 91 |

The gypsum plaster samples containing pure Wocosen have a biocidal loading of 0.085%. The samples containing Wocosen—intercalated into hydrophobic modified clay—, have a loading of 0.10%, since the biocide loading of the hydrophobic clay/Wocosen material used is 9.1%. The mass increase of calcium sulfate hemi-hydrate upon hydration is 1.18 times that of the original amount.

With the abovementioned recipes an amount of 80 reference samples, 200 pure Wocosen and 380 Wocosen—intercalated into hydrophobic modified clay—samples are produced for introduction in the rain test set up.

Figure 7:
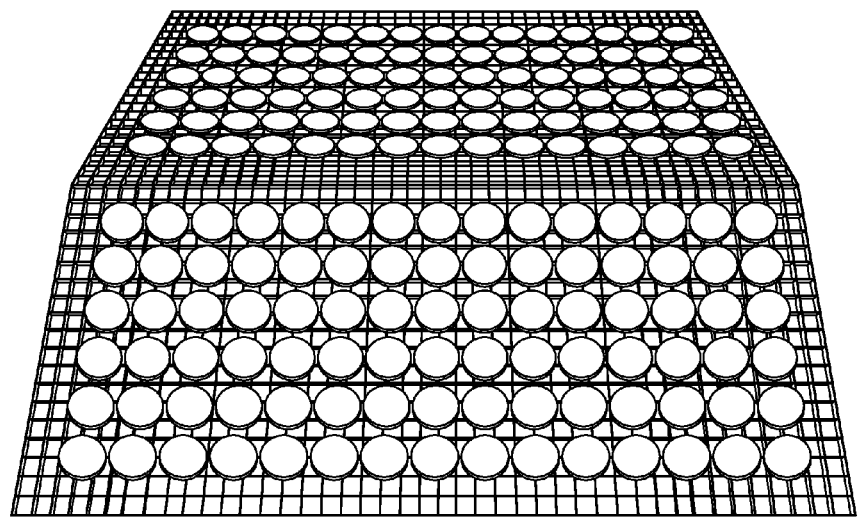
FIG. 7 depicts a plastic grid upon which the sample cups with plaster can be mounted.
Figure 8:
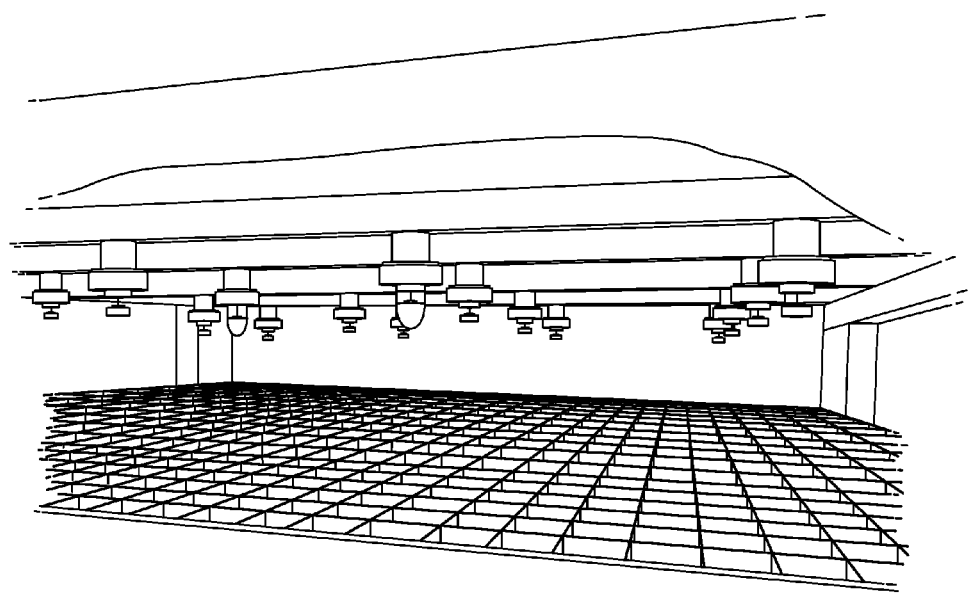
FIG. 8 depicts an array of spray heads placed over the sample grid.
Figure 9:
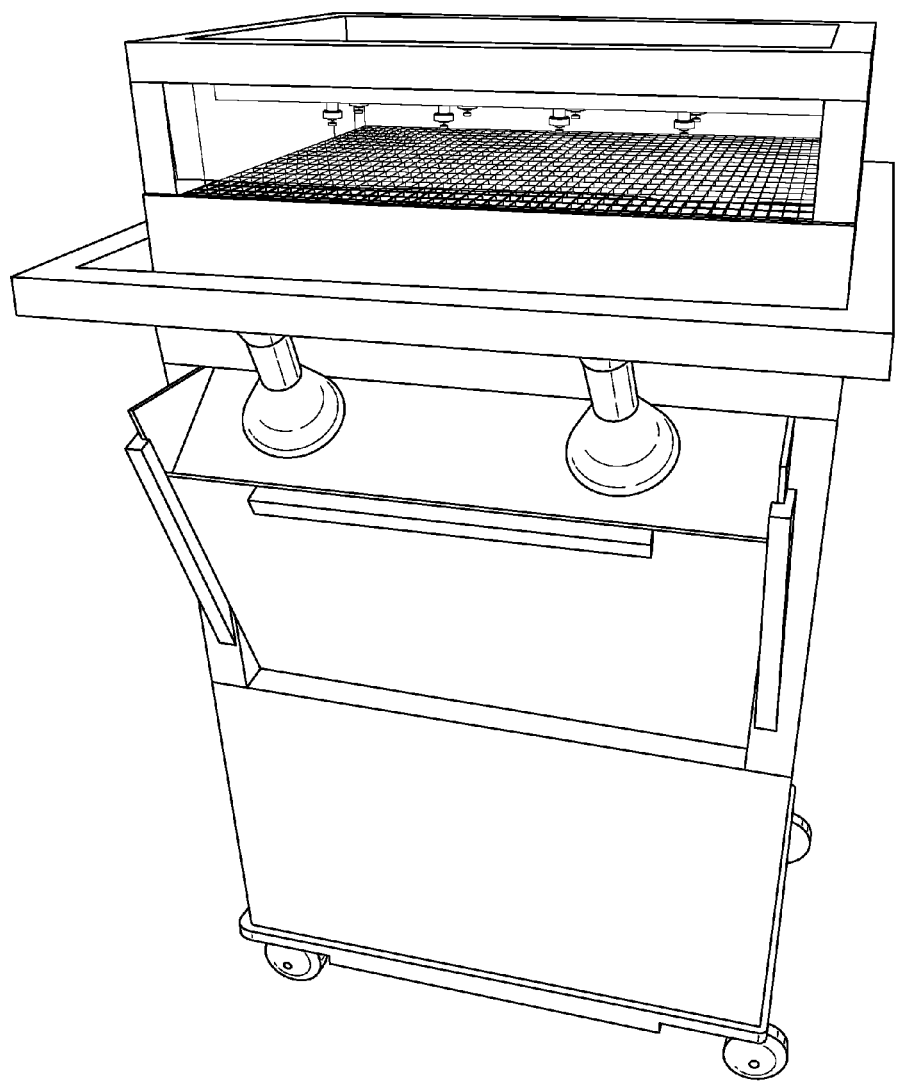
FIG. 9 depicts lamps used to speed up the drying time of the samples.

The rain test set up comprises a plastic grid upon which the sample cups with plaster can be mounted (FIG. 7). An array of spray heads is placed over the sample grid (FIG. 8). From these spray heads a spray of water is repeatedly applied upon the samples. The rain test is performed in a frequency of 6 spray applications (3 min each) a day. After every spray application, a drying sequence is applied using 375 W lamps to speed up the drying time of the samples (FIG. 9). The maximum temperature on the surface of the samples is 40° C.

At certain intervals, a number of samples are removed from the test set up. A part of the samples (2) are analysed for residual Wocosen whilst the others (8) are used to test the fungal growth on the sample surface after inoculation with *Penicillium chrysogerum*. The inoculation was performed using 106 spores/ml of *Penicillium chrysogerum* spores in a Czapek solution to provide the fungus with sufficient nutrients to grow upon incubation.

In order to quantify the amount of residual Wocosen in the gypsum samples used in the rain test, an extraction is performed. To do so, the gypsum sample is removed from the polystyrene disc and weighed into a glass jar. Subsequently a weighed amount of di-sodium EDTA/ammonium carbonate solution (consisting of 150 g di-sodium EDTA, 100 g ammonium carbonate and 1000 ml demi-water) is added (approximately 100 g). This mixture is stirred overnight in the closed jar to obtain virtually complete dissolution of the gypsum matrix material. Subsequently 50 g of ethanol is added to ensure complete dissolution of Wocosen. After this, a sample is taken from the extraction liquid and filtered over a 0.45 micrometer syringe filter. This sample is analysed using a Waters HPLC apparatus with an Omnispher 5 C18 column.

The samples (in duplo) taken out the rain test, at regular intervals, are extracted according to the above mentioned method. The quantitative HPLC data on the residual amounts of Wocosen per sample are recalculated back to a percentage of the amount of biocide that is initially present in that specific sample. FIG. 7 shows this residual percentage of Wocosen for both the pure Wocosen samples and the Wocosen—intercalated into hydrophobic modified clay—samples.

It is evident that the release rate of the pure Wocosen from the gypsum samples is much faster than that of the Wocosen—intercalated into hydrophobic modified clay—samples. The pure Wocosen containing samples are already depleted from most of their biocide content within 15 days. The Wocosen—intercalated into hydrophobic modified clay—samples still show a residual amount of around 30% biocide after 31 days of exposure to the rain test conditions.

The biological evaluation test using the inoculation of *Penicillium* chrysogerum spores, performed in duplo, show the results as depicted in Tables 3 to 8.

The samples have been inoculated with *Penicillium chrysogenum*. 0.5 ml of 4×10$^6$ spores/ml solution has been applied to each gypsum sample. The spore suspension has been mixed before inoculation with a nutrient salt solution (Czapeck). After inoculation the samples have been incubated at 25° C. and at a RH of 97.5%.

TABLE 3

Wocosen (incubation I)

| Days of exposition in rain test | Nr of samples (x out of three) with fungal growth |
|---|---|
| 1 | 0 |
| 2 | 0 |
| 3 | 0 |
| 4 | 0 |
| 5 | 0 |
| 6 | 2 |
| 7 | 0 |
| 8 | 2 |
| 9 | 3 |
| 10 | 3 |
| 13 | 3 |
| 14 | 2 |
| 15 | 3 |
| 16 | 3 |
| 24 | 2 |

TABLE 4

Wocosen-clay (incubation I)

| Days of exposition in rain test | Nr of samples (x out of three) with fungal growth |
|---|---|
| 6 | 0 |
| 7 | 0 |
| 8 | 0 |
| 9 | 0 |
| 10 | 0 |
| 13 | 0 |
| 17 | 0 |
| 24 | 0 |
| 27 | — |
| 31 | — |

TABLE 5

Reference (incubation I)

| Days of exposition in rain test | Nr of samples (x out of one) with fungal growth |
|---|---|
| 6 | 1 |
| 7 | 1 |
| 8 | 1 |
| 9 | 1 |
| 10 | 1 |
| 13 | 1 |
| 14 | 1 |
| 15 | 1 |
| 24 | 1 |
| 27 | 1 |

TABLE 6

Wocosen (incubation II)

| Days of exposition in rain test | Nr of samples (x out of three) with fungal growth |
|---|---|
| 1 | 0 |
| 2 | 0 |
| 3 | 0 |
| 4 | 0 |
| 5 | 0 |
| 6 | 0 |
| 7 | 1 |
| 8 | 2 |
| 9 | 3 |
| 10 | 2 |
| 13 | 2 |
| 14 | 3 |
| 15 | 1 |
| 16 | 3 |
| 24 | 3 |

TABLE 7

Wocosen-clay (incubation II)

| Days of exposition in rain test | Nr of samples (x out of three) with fungal growth |
|---|---|
| 6 | 0 |
| 7 | 0 |
| 8 | 0 |
| 9 | 0 |
| 10 | 0 |
| 13 | 0 |
| 17 | 0 |
| 24 | 0 |
| 27 | — |
| 31 | — |

TABLE 8

Blanco (incubation II)

| Days of exposition in rain test | Nr of samples (x out of one) with fungal growth |
|---|---|
| 6 | 1 |
| 7 | 1 |
| 8 | 1 |
| 9 | 1 |
| 10 | 1 |
| 13 | 1 |
| 14 | 1 |
| 15 | 1 |
| 24 | 1 |
| 27 | 1 |

Figure 10:
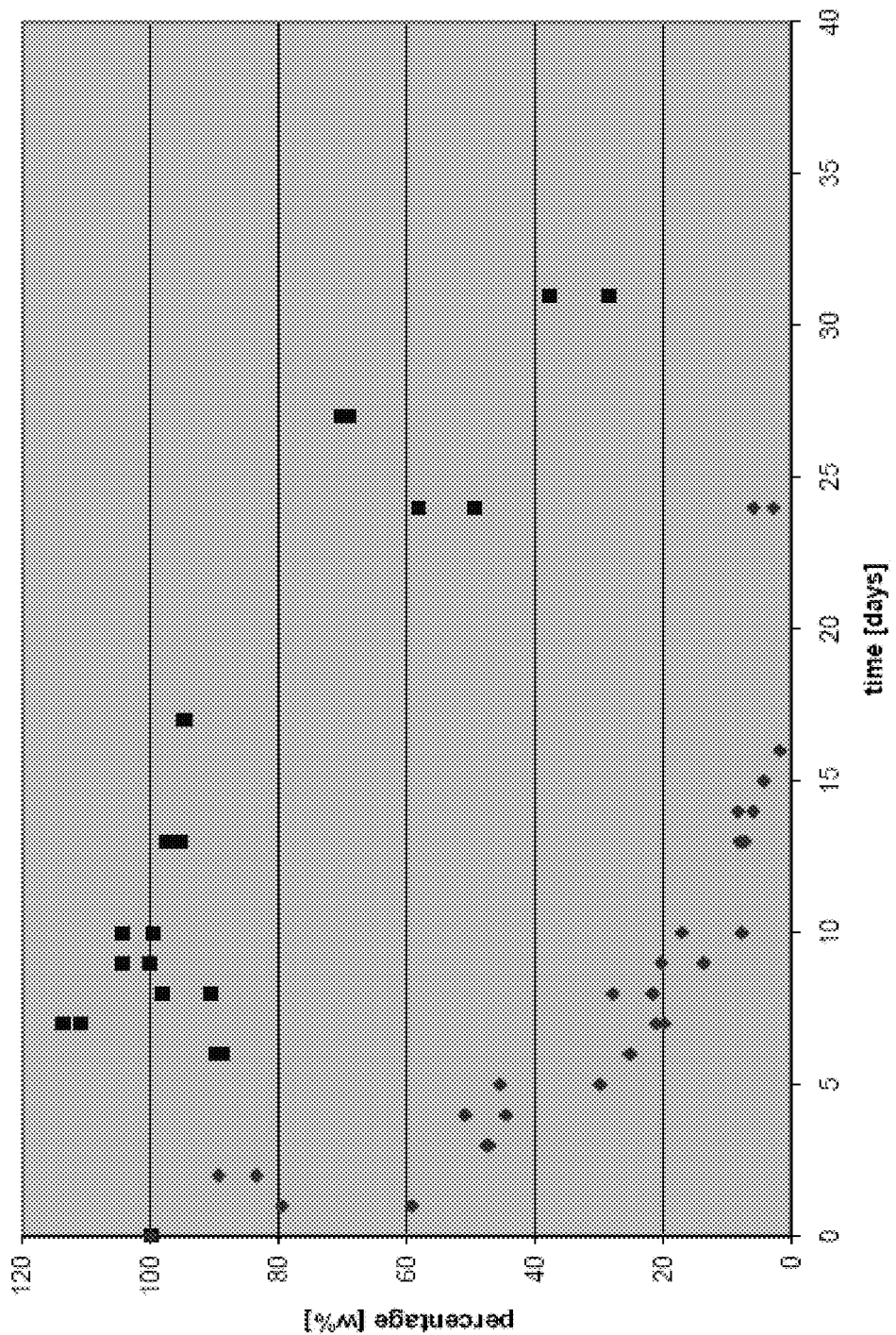
FIG. 10 graphically depicts Wocosen remaining in gypsum samples during a rain test. Squares, Wocosen-clay; diamonds, Wocosen (pure).

From these results it is clear that the samples that do not contain biocide all show fungal growth. The samples containing only Wocosen show a fungal growth after six to seven days in the rain test. The Wocosen-clay samples show no fungal growth up to 24 days (see FIG. 10).

What is claimed:

1. A construction composition comprising a construction material and a biocide molecule release agent, wherein the biocide molecule release agent includes an inorganic material being either a negatively charged clay or a positively charged layered double hydroxide, wherein the inorganic material is modified with one or more ionic organic modifier compounds and wherein said inorganic material is intercalated with a biocide molecule being a fungicide, an algicide or a bactericide, wherein the construction material is cement, plaster, jointing compound, paint, glue, plastics, wallpaper, wood, textiles, straw, or thatch.

2. The construction composition according to claim 1, wherein the one or more ionic organic modifier compounds have a chemical or physical interaction with the biocide molecule.

3. The construction composition according to claim 1, wherein the inorganic material is modified with a mixture of at least two different ionic organic modifier compounds.

4. The construction composition according to claim 1, wherein the one or more ionic organic modifier compounds are ammonium compounds, phosphonium compounds, or sulphonium compounds, or mixtures thereof in combination with a negatively charged clay.

5. The construction composition according to claim 1, wherein the fungicide, algicide or bactericide is one or more of substituted benzenes, thiocarbamates, ethylene bis dithiocarbamates, thiophthalimides, organomercury compounds, pyrithiones or organotin compounds.

6. The construction composition according to claim 5, wherein the fungicide, algicide or bactericide is one or more of propiconazole, carbonic acid, butyl-3-iodo-2-propynylester, 1-[2-(2,4-dichlorophenyl)-2-(2-prop enyloxy)ethyl] 1H imidazole, bethoxazin, zinc pyrithione, sodium pyrithione, hydroxypyridone or bispyrithione.

7. The construction composition according to claim 1, comprising 1-60 000 ppm by weight of the biocide molecule, based on the total weight of the construction material.

8. The construction composition according to claim 1, wherein at least 25% of the exchange capacity of the inorganic material is occupied by the one or more ionic organic modifier compounds.

9. The construction composition according to claim 1, wherein the inorganic material comprises at least 1 wt. % of the biocide molecule, based on the total weight of the modified and loaded inorganic material.

10. A method for controlling the release profile of a specific biocide molecule in a construction material, comprising
providing an inorganic material being either a negatively charged clay or a positively charged layered double hydroxide;
adjusting the affinity of the inorganic material to the specific biocide molecule by modifying the inorganic material with one or more ionic organic modifier compounds;
intercalating the modified inorganic material with the biocide molecule being a fungicide, an algicide or a bactericide; and
including the modified and intercalated inorganic material in the construction material, wherein the construction material is cement, plaster, jointing compound, paint, glue, plastics, wallpaper, wood, textiles, straw, or thatch.

11. The method according to claim 10, wherein the one more ionic organic modifier compounds have a chemical or physical interaction with the biocide.

12. A method for reducing or preventing microbial fouling in a construction material comprising including into the construction material an inorganic material being either a negatively charged clay or a positively charged double hydroxide, wherein the inorganic material is modified with one or more ionic organic modifier compounds and wherein said inorganic material is intercalated with a biocide molecule being a bactericide, wherein the construction material is cement, plaster, jointing compound, paint, glue, plastics, wallpaper, wood, textiles, straw, or thatch.

13. A method for reducing or preventing fungi fouling in a construction material comprising including into the construction material an inorganic material being either a negatively charged clay or a positively charged layered double hydroxide, wherein the inorganic material is modified with one or more ionic organic modifier compounds and wherein said inorganic material is intercalated with a biocide molecule being a fungicide, wherein the construction material is cement, plaster, jointing compound, paint, glue, plastics, wallpaper, wood, textiles, straw, or thatch.

14. A method for reducing or preventing algae fouling in a construction material comprising including into the construction material an inorganic material being either a negatively charged clay or a positively charged layered double hydroxide, wherein the inorganic material is modified with one or more ionic organic modifier compounds and wherein said inorganic material is intercalated with a biocide molecule being an algicide, wherein the construction material is cement, plaster, jointing compound, paint, glue, plastics, wallpaper, wood, textiles, straw, or thatch.

15. The construction composition according to claim 1, wherein the negatively charged clay is smectite, montmorillonite, kaolinite, vermiculite, bentonite, saponite, or hectorite.

16. The construction composition according to claim 1, wherein the positively charged layered double hydroxide is hydrotalcite.

17. The construction composition according to claim 1, comprising 1-30 000 ppm by weight of the biocide molecule, based on the total weight of the construction material.

18. The construction composition according to claim 8, wherein at least 50% of the exchange capacity of the inorganic material is occupied by the one or more ionic organic modifier compounds.

19. The construction composition according to claim 8, wherein at least 100% of the exchange capacity of the inorganic material is occupied by the one or more ionic organic modifier compounds.

20. The construction composition according to claim 9, wherein the inorganic material comprises at least 1-60% wt of the biocide molecule, based on the total weight of the modified and loaded inorganic material.

21. The construction composition according to claim 9, wherein the inorganic material comprises at least 10-30 wt. % of the biocide molecule, based on the total weight of the modified and loaded inorganic material.

22. The construction composition according to claim 1, wherein the one or more ionic organic modifier compounds are conjugate bases of carboxylic acids, phosphonic acids, sulphonic acids or mixture thereof in combination with a positively charged layered double hydroxide.

* * * * *